Aug. 15, 1967 R. A. SNOOK 3,335,887
GRAVITY-UNLOADING TYPE TRAILER
Filed Aug. 16, 1965 4 Sheets-Sheet 1
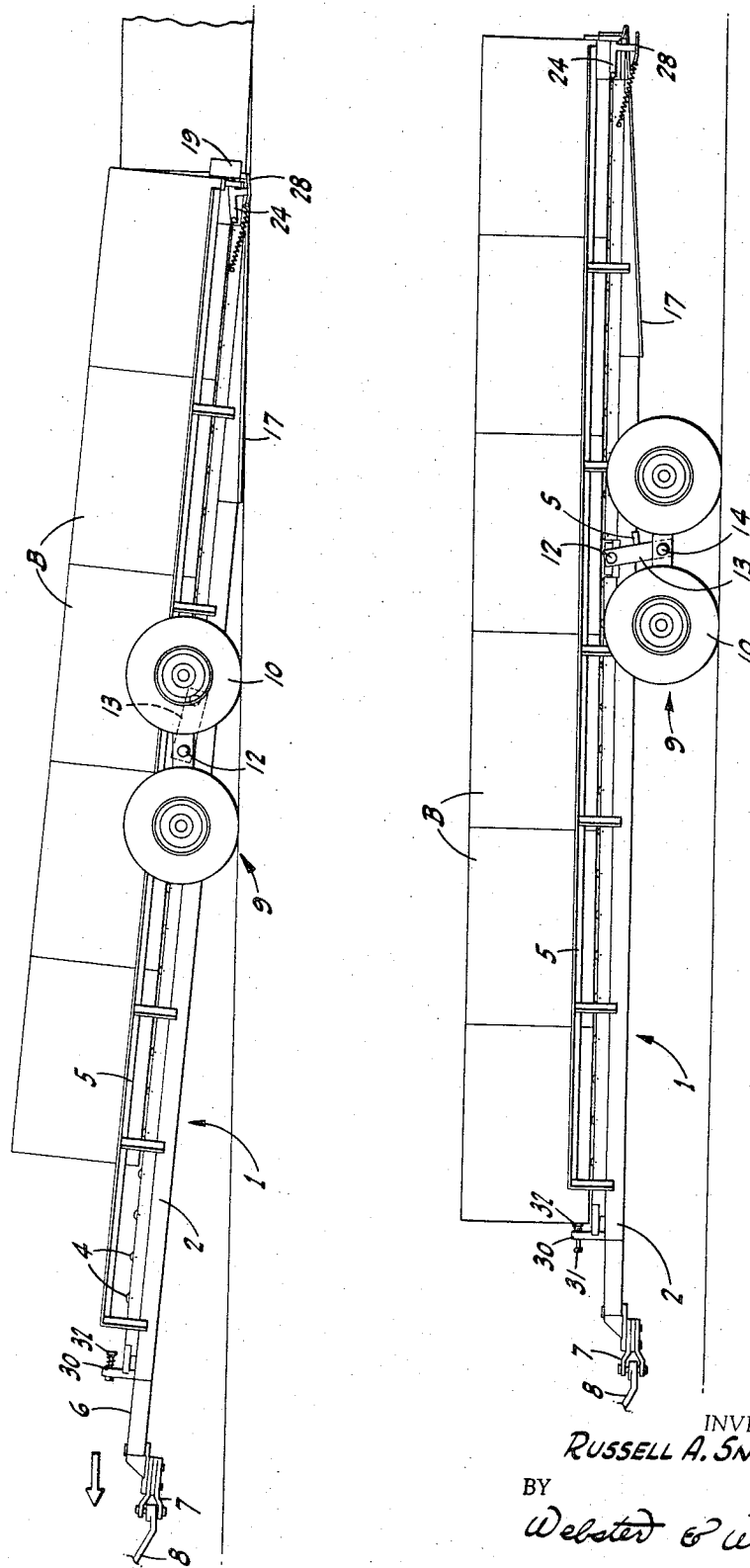
INVENTOR.
RUSSELL A. SNOOK
BY
Webster & Webster
Attorneys Aug. 15, 1967 R. A. SNOOK 3,335,887
GRAVITY-UNLOADING TYPE TRAILER
Filed Aug. 16, 1965 4 Sheets-Sheet 3
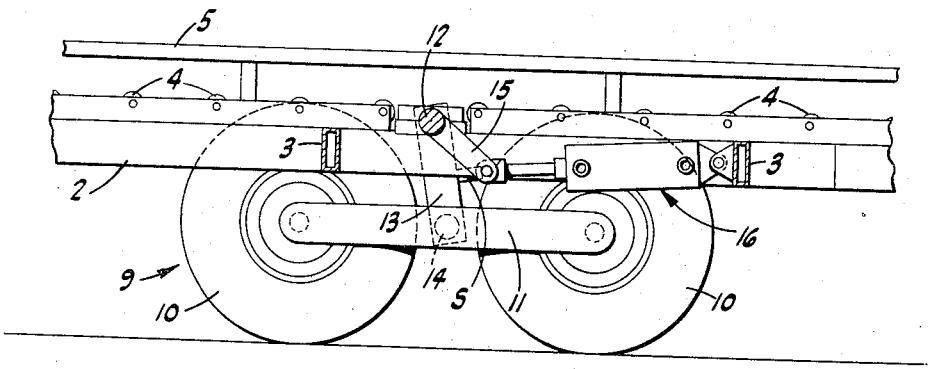
FIG-4
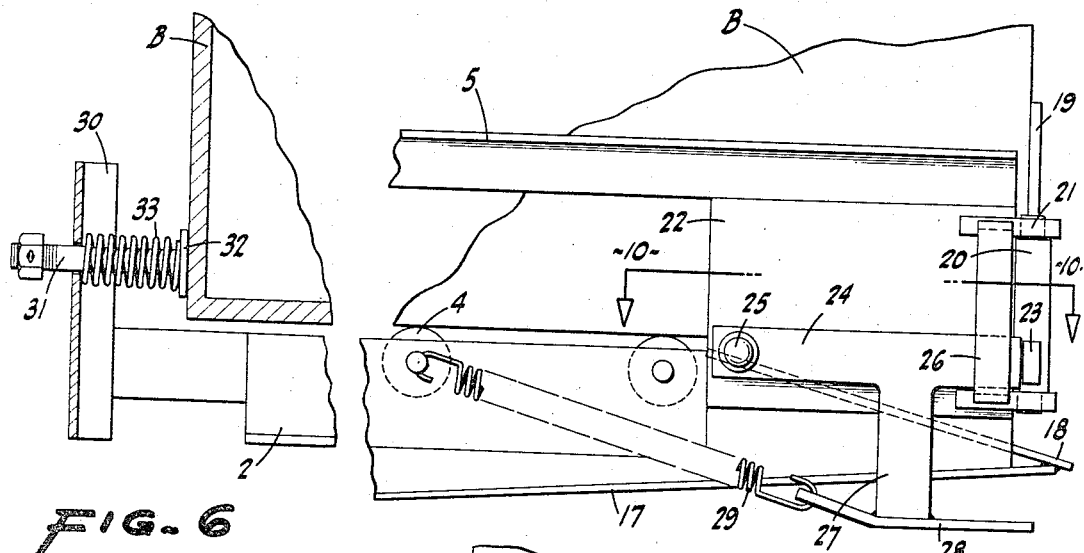
FIG-6
FIG-5
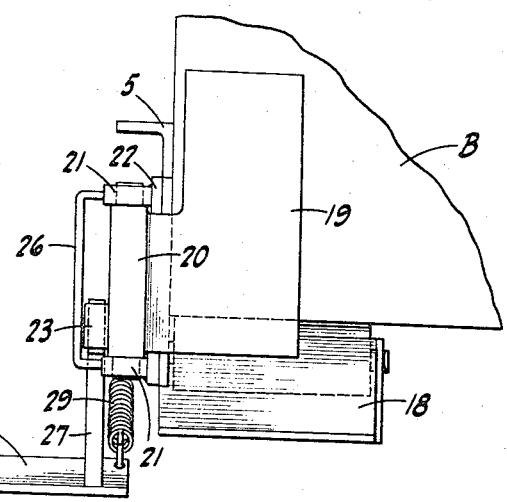
FIG-7

United States Patent Office 3,335,887
Patented Aug. 15, 1967

3,335,887
GRAVITY-UNLOADING TYPE TRAILER
Russell A. Snook, Rio Vista, Calif., assignor to Blackwelder Manufacturing Company, Rio Vista, Calif., a corporation of California
Filed Aug. 16, 1965, Ser. No. 479,788
4 Claims. (Cl. 214—506)

ABSTRACT OF THE DISCLOSURE

A trailer having an elongated, bin-row supporting bed from the rear end of which the bins are discharged onto the ground upon the bed being inclined with said end in ground engagement; there being stop gates, normally preventing such discharge of the bins, which are automatically moved to a bin-releasing position when the bed is so inclined. Also, spring-pressed units on the trailer normally hold all bins of a fully loaded bed in contact with each other to prevent accidental escape of said bins from such bed during travel of the trailer.

---

In particular, the invention is directed to, and it is a major object to provide, a trailer—of elongated flat-bed type—adapted to receive and move a longitudinal row of large, produce-receiving bins into the field for loading, and to then carry the row of loaded bins to a staging area where such bins are gravity-discharged onto the ground for subsequent placement on a highway type truck for transport to a produce processing plant.

The elongated bin-row supporting bed of the trailer is adapted at its front end for connection with a normally vertically fixed drawbar of a tractor or field truck; said front end of the trailer thus being maintained at a constant level.

It is another important object of this invention to provide the trailer—characterized as in the preceding paragraph—with wheels normally horizontally supporting the bed intermediate its ends, and mechanism between the wheels and bed operative to cause lowering of the bed at the wheels and thus to a rearwardly and downwardly inclined position for gravity-discharge of the row of loaded bins onto the ground.

It is an additional object of the invention to provide a mechanism, as above, which includes a power cylinder unit which is effective—selectively—to raise, and initiate lowering, of the bed relative to the wheels; such mechanism being arranged so that the bed-lowering load is automatically taken off the power cylinder unit after the initial lowering movement of the bed by said unit, and continuance of such movement is slow and gentle until the rear end of the bed rests on the ground.

Normally latched but releasable stop gates are mounted on the bed at its rear end to prevent escape of the bins from the bed when the latter is in its raised, horizontal position; a further object of the invention being to provide means for automatically releasing the stop gates when the bed is in its lowered, downwardly and rearwardly inclined position, and so as to then allow the bins to slide from the bed and onto the ground without restriction.

The trailer bed is arranged to receive and support a predetermined number of bins in a single-file row, and it is also an object of the invention to provide spring pressure units at the front end of the bed and engaging the foremost bin thereon; such spring pressure units functioning to exert a rearward push on said foremost bin whereby all the bins of the row are maintained in tight contact with each other, with the rearmost bin bearing against the stop gates. Thus, possible bouncing of the bins off the bed—when the trailer is traversing rough terrain—is prevented.

A further object of the invention is to provide a gravity-unloading type trailer which is designed for ease and economy of manufacture.

A still further object of the invention is to provide a practical, reliable, and durable gravity-unloading type trailer and one which is exceedingly effective for the purpose for which it is designed.

These objects are accomplished by means of such structure and relative arrangement of parts as will fully appear by a perusal of the following specification and claims.

In the drawings:

FIG. 1 is a side elevation of the improved gravity-unloading type trailer, shown with the bed in its raised horizontal position for transport of the row of bins.

FIG. 2 is a similar view of the trailer, but with the bed in its lowered, downwardly and rearwardly inclined position for discharge of the row of bins.

FIG. 4 is a fragmentary longitudinal sectional elevation of the trailer, taken on line 4—4 of FIG. 3, and showing the bed raising and lowering mechanism; the bed being in raised, horizontal position as in FIG. 1.

FIG. 5 is a fragmentary enlarged elevation of the rear end portion of the trailer bed in raised position, showing the near stop gate in latched position; the view being taken on line 5—5 of FIG. 3.

FIG. 6 is a fragmentary enlarged sectional elevation of the forward end portion of the trailer bed, showing one of the spring pressure units; the view being taken on line 6—6 of FIG. 3.

FIG. 7 is a fragmentary rear end elevation of the trailer bed, showing the stop gate illustrated in FIG. 5.

Figure 3:
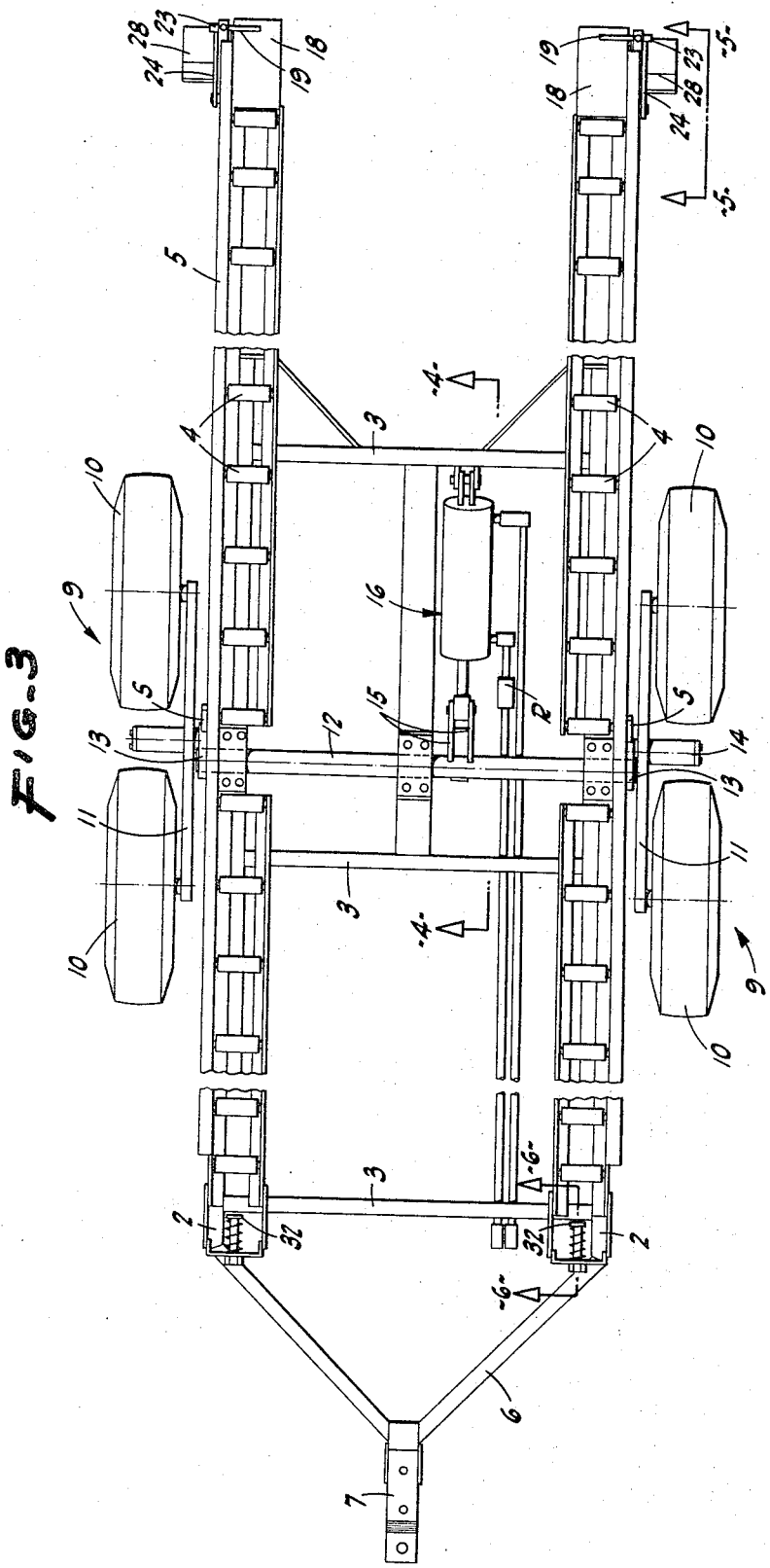
FIG. 3 is a foreshortened and enlarged top plan view of the trailer.
Figure 8:
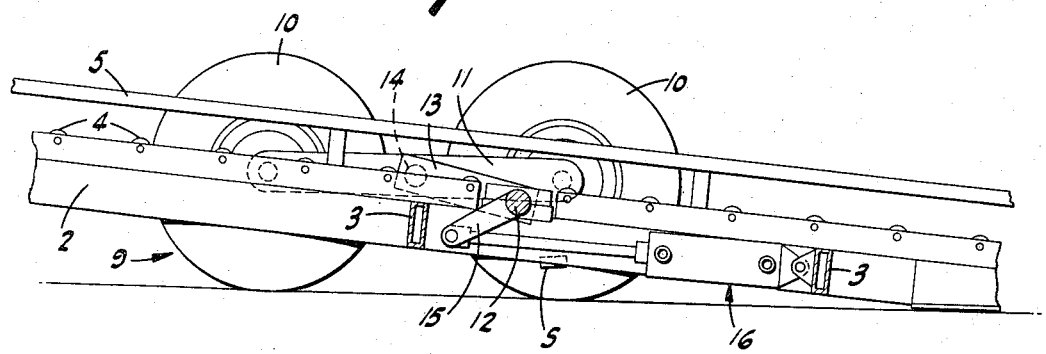
FIG. 8 is a fragmentary longitudinal sectional elevation of substantially the same portion of the trailer as is shown in FIG. 4, but with the bed in its lowered, downwardly and rearwardly inclined position as in FIG. 2.

Referring now more particularly to the drawings and to the characters of reference marked thereon, the trailer comprises an elongated bed, indicated generally at 1; such bed including a pair of transversely spaced, rigid elongated frame beam units 2 connected at intervals in their length by cross beams 3. Suitably supported on and extending substantially the full length of the beam units 2 are rows of transversely extending load-supporting rollers 4; the rectangular bins B—which the trailer is designed to carry in single file order—resting on the rows of rollers 4. The bins B are guided and prevented from lateral displacement by guard rails 5 upstanding from the beam units 2 adjacent but laterally out from the rollers 4.

At its forward end, the bed 1 is provided with a V-tongue 6—rigid with the beam units 2—having a clevis 7 at its forward end adapted for coupling engagement with the drawbar 8 of a tractor or truck; the drawbar 8 normally being in a fixed vertical position.

Generally midway of its ends, the trailer is provided with a bogie truck 9; the pairs of wheels 10 of which are disposed laterally out a short distance from the beam units 2 of bed 1. The axles of each pair of wheels are mounted in and connected by a rigid horizontal bar 11. A cross shaft 12 extends from side to side of the trailer and is journaled in the beam units 2; said shaft being disposed in a vertical plane substantially midway between the axles of the wheels. Arms 13—rigid with the shaft 12—depend from the ends thereof between the beam units 2 and the bars 11; said arms 13 being connected at their lower ends to said bars 11—centrally of the ends thereof—by stub shafts or trunnions 14.

A relatively short radial arm 15 projects from the cross shaft 12 intermediate its ends and is rigid therewith; said radial arm 15 being normally disposed at a downward angle toward the rear end of the trailer when the arms 13 are in a substantially vertical position, as shown in FIG. 4. At its lower end, the arm 15 is connected to one end of a substantially horizontal, double-acting hydraulic power cylinder unit 16; the other end of said power cylinder unit being anchored to an adjacent cross beam 3.

Upon the power cylinder unit 16 being actuated, the arms 13 will be swung away and upwardly from their initial depending position, with the result that the bars 11 will be raised relative to the beam units 2, and hence the bed of the trailer lowered.

It will be noted that when the trailer bed is in its raised, horizontal position, the arms 13—as shown in FIG. 4—are disposed in a past dead-center position relative to the direction in which said arms are swung to cause the trailer bed to be lowered. The arms 13 then engage against stop lugs S secured to the related beam units 2, so that no strain is placed on the power cylinder unit 16 when the trailer bed is in a raised, horizontal position. When the power cylinder unit 16 is actuated and initially moves the arms 13 away from their dead-center position, the weight of the trailer bed then becomes effective to rotate the arms 13 and shaft 12. This, of course, relieves the power cylinder unit of its load, and causes the fluid to be pushed out of the cylinder. Such flow of fluid from the cylinder is retarded by a suitable restriction device R in the then fluid outflow line, and so that a slow lowering of the trailer bed takes place.

As the front end of the trailer (at the point of connection with the drawbar of the hauling vehicle) is normally held in a fixed vertical position, the trailer bed—upon lowering thereof—assumes a downward and rearward incline to the ground. See FIG. 2.

To enable the trailer bed to firmly rest at its rear end on the ground when said bed is thus inclined, the beam units 2 at their rear ends are provided with elongated bottom shoes 17 which flatly engage the ground as shown.

Directly above the bottom shoes 17, and extending from the rear ends thereof to the rear ends of the rows of rollers 4, are downwardly sloping ramps 18. These ramps—which are adapted to engage the bins as they leave the rollers—enable said bins to slide gently from the trailer bed onto the ground when said bed is in its lowered, inclined position and the trailer is pulled forward by the hauling vehicle.

Figure 9:
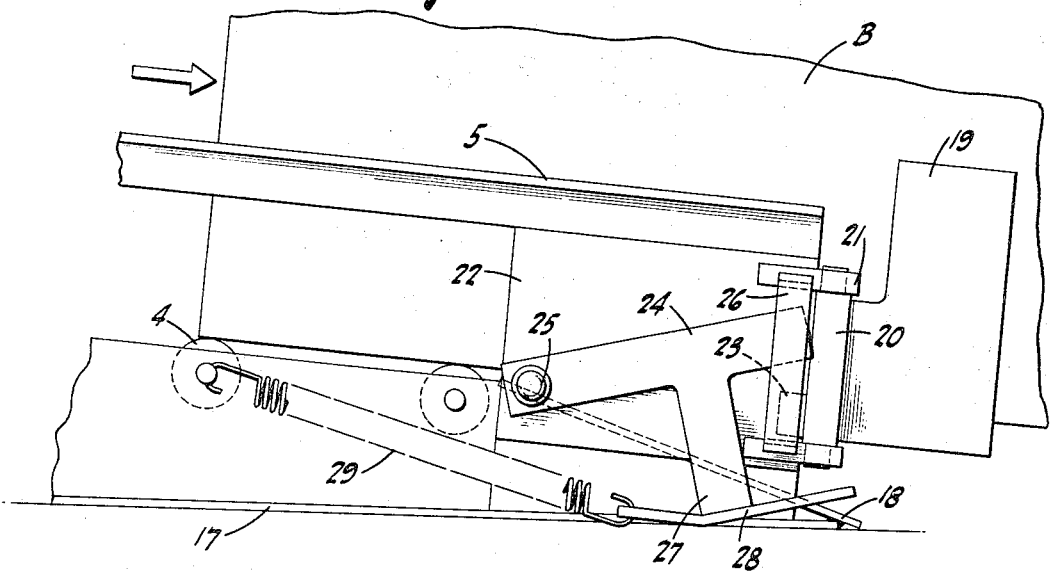
FIG. 9 is a fragmentary enlarged elevation of the rear end portion of the trailer bed, substantially the same as FIG. 5, but with said bed lowered and showing the near stop gate as released for discharge of the row of bins.
Figure 10:
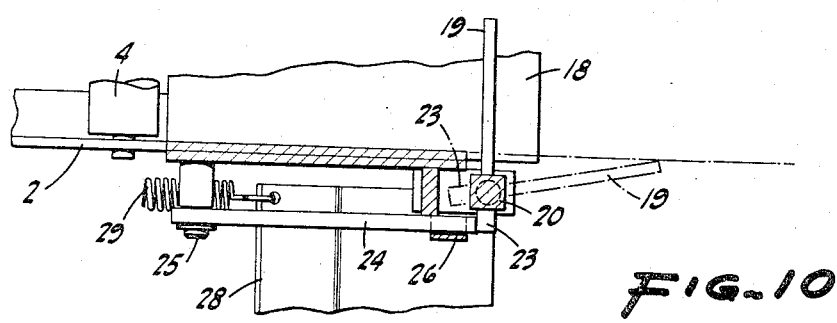
FIG. 10 is a fragmentary sectional plan, taken on line 10—10 of FIG. 5.

To prevent the single-file row of bins from possibly sliding off the trailer bed when the latter is in its raised, horizontal position for transport, stop gate and latch mechanisms are provided at the rear end of the trailer, as shown in detail in FIGS. 5, 7, 9 and 10. There is one such mechanism on each side of the trailer and—as they are alike—a description of one will suffice for both.

Each such stop gate and latch mechanism comprises a vertical stop gate 19 adapted to normally extend transversely and laterally inward from a point adjacent the rear end of the related beam unit 2. Along its laterally outer edge, the stop gate 19 is fixed on a vertical shaft 20 which is journaled at its ends, as at 21, from an adjacent frame part 22 rigid with said related beam unit 2.

Rigid with and projecting radially out from the shaft 20 adjacent the lower end thereof, and in substantially opposed alinement with the gate 19, is a lug 23. The front face of the lug 23 is normally engaged by the rear end of a forwardly projecting latch bar 24 which at its forward end is pivoted, as at 25, on said frame part 22. The latch bar 24 is prevented from possible lateral outward deflection by vertical guide strap 26 which embraces the bar adjacent its rear end and extends between and is secured to the journal members 21.

Formed with and depending from the latch bar 24 intermediate its ends is a standard 27 which on its lower end carries a ground engageable shoe 28. A tension spring 29 extends forwardly from said shoe to connection at a point ahead thereof with the related beam unit 2. The spring 29 acts, in connection with the shoe 28, to yieldably swing the latch bar 24 downwardly about its pivot 25; such downward movement being limited by lower edge engagement of said latch bar adjacent its rear end with the lower journal member 21.

When the latch bar 24 is thus engaged, it is maintained by the spring 29 in a horizontal position engaging the lug 23, and the shoe 28 is disposed some distance below the related bottom shoe 17, as shown in FIG. 5. The stop gate 19 is thus latched in a transverse bin-retaining position and prevents escape of rearmost bin B from the rear end of the trailer bed. When, however, the trailer bed is lowered to its downwardly and rearwardly inclined position (as previously explained) the bottom shoes 17 contact and rest on the ground, and the shoes 28 also engage the ground and are relatively lifted until they are level with the shoes 17. When this occurs the latch bars 24 are swung upwardly and clear the related lugs 23, thus enabling any pressure against the forward faces of the gates 19 to swing the same rearwardly to a position clear of the path of the bins B. See FIGS. 9 and 10.

It will, therefore, be seen that as soon as the trailer bed is lowered to its inclined position, the stop gates will be immediately unlatched or released whereupon the pressure of the row of bins against said stop gates will cause the latter to swing to an open position, allowing the entire row of produce loaded bins to slide by gravity down and onto the ground as the trailer is advanced and the bed drawn away from said bins. Thereafter, the bins may be individually engaged and lifted by a fork-lift truck, and placed on a highway type truck for transport to a produce processing plant.

It should be noted that—while the described latch arrangement and each stop gate is automatically released upon the trailer bed being lowered—each such stop gate must be reset by hand to its initial bin-retaining position, whereupon the latch bar 24 is returned to its initial position end-engaging against the lug 23.

The length of the trailer bed is such that it will accommodate a predetermined number of bins B in end-to-end contact. To hold the row of bins (particularly when empty) tight and against the stop gates 19, and thus prevent the bins from possibly bouncing out of position or off the trailer when the latter is traversing uneven ground, the following spring pressure arrangement is provided:

Short rigid standards 30 are supported from the forward ends of the beam units 2 ahead of and aligned with the bin-supporting rows of rollers 4. A horizontal pin 31, having a head 32 on its rear end for engagement with the forward face of the foremost bin B, is slidably mounted in each standard 30; a compression spring 33 being disposed about the pin 31 between the head 32 and the standard 30. Such springs act to force the pins 31 and the row of bins rearwardly with said bins in engagement with each other and with the rearmost bin against the stop gates 19. Since the bins are all supported on rollers, it takes little pressure to shift said bins rearwardly.

It should be observed that the bins—when empty—are of relatively light weight, and thus may be easily lifted and placed on the raised trailer bed. However, when loaded, the bins are very heavy and hence the present manner of gravitational discharge of the loaded bins from the inclined trailer bed is of major importance.

By virtue of the described mechanism for raising and lowering the bed, such bed advantageously assumes a gentle or shallow angle when in lowered bin-discharging position; the bins thus flowing easily and gently off the bed and onto the ground with a minimum of frictional engagement or digging in, and without any tendency of the rearmost bin to drop with a load-bruising jar upon freeing from the bed, or to wedge at the upper front edge in damaging relation with the next following bin.

From the foregoing description, it will be readily seen that there has been produced such a gravity-unloading type trailer as substantially fulfills the objects of the invention, as set forth herein.

While this specification sets forth in detail the present and preferred construction of the gravity-unloading type trailer, still in practice such deviations from such detail may be resorted to as do not form a departure from the spirit of the invention, as defined by the appended claims.

Having thus described the invention, the following is claimed as new and useful and upon which Letters Patent is desired:

1. A gravity-unloading type trailer comprising an elongated bed to support a row of load-receiving bins and adapted at its forward end for connection to the drawbar of a hauling vehicle so as to maintain the forward end of the bed at a constant aboveground level, wheels supporting the bed at the sides and intermediate the ends thereof, means between the wheels and bed to lower the bed from a horizontal position to a lowered, downwardly and rearwardly inclined position with the rear end of the bed at ground level, said means comprising a cross shaft journaled on the bed adjacent the wheels, depending arms rigid with the shaft and connected at their lower ends to the wheels, said arms being in a substantially vertical position when the bed is in a horizontal position; and a power unit mounted on the bed and operatively connected to the shaft to oscillate the same to cause the arms to be disposed in a position at a downward slope from said shaft and to return the arms to said substantially vertical position, selectively; the arms when in said substantially vertical position being disposed beyond dead center in a direction opposite to the direction of rotation of the shaft necessary to swing the arms to said downwardly sloping position, and stops on the bed in position to then engage the arms.

2. A gravity-unloading type trailer comprising an elongated bed to support a row of load-receiving bins and adapted at its forward end for connection to the drawbar of a hauling vehicle so as to maintain the forward end of the bed at a constant aboveground level, wheels supporting the bed at the sides and intermediate the ends thereof, means between the wheels and bed to lower the bed from a horizontal position to a lowered, downwardly and rearwardly inclined position with the rear end of the bed at ground level, upstanding stop gates on the bed at opposite sides and at the rear end thereof, and said stop gates normally projecting laterally inwardly into the path and thus preventing escape of the rearmost bin from the bed when the latter is horizontal; each stop gate including a vertical shaft rigid therewith and extending along the laterally outer edge thereof, journal means on the bed for the ends of such shaft, a lug rigid with and projecting from the shaft intermediate its ends in substantially opposed alinement wtih the stop gate, an initially generally horizontal latch bar extending lengthwise of the bed and normally engaging at its rear end against the forward face of the lug, means transversely pivoting the latch bar on the bed for vertical swinging movement, and means functioning upon lowering of the bed to said inclined position to swing the latch bar vertically and clear of the lug whereby the stop gate may swing to an open bin-discharging position.

3. A trailer, as in claim 2, in which the last named means comprises a standard depending in rigid relation from the latch bar intermediate its ends, and a ground engageable shoe on the lower end of the standard initially disposed at a level below that of the rear end of the bed; such shoe engaging the ground and being relatively moved upwardly when the bed is lowered to said inclined position.

4. In a trailer having a bed adapted to support a predetermined number of load-receiving bins in a single file row, antifriction elements on the bed on which the bins ride, releasable stop means on the bed at its rear end against which the rearmost bin of the row is adapted to abut, and spring-pressed means mounted on the bed at its forward end adapted to engage the foremost bin of the row and to exert sufficient pressure against the same to maintain all the bins in contact with each other and the rearmost bin engaged with the stop means; said spring pressed means comprising a pin extending lengthwise of the bed, the pin having an enlarged head on its rear end to engage the foremost bin, a standard upstanding from the bed supporting and through which the pin is slidable, and a compression spring on the pin between the head and standard.

References Cited

UNITED STATES PATENTS

| 1,165,573 | 12/1915 | Cutler et al. | 105—374 |
| 1,289,122 | 12/1918 | Cutler et al. | 105—374 |
| 2,788,908 | 4/1957 | Lynd | 280—43.11 X |
| 2,835,399 | 5/1958 | Buchholz | 214—506 |
| 2,992,750 | 7/1961 | Brock | 214—506 |
| 3,012,682 | 12/1961 | Williamson. | |
| 3,180,510 | 4/1965 | Moller | 214—506 |

FOREIGN PATENTS 726,877  3/1932  France.

GERALD M. FORLENZA, *Primary Examiner.*

ALBERT J. MAKAY, *Examiner.*